(12) United States Patent
Maltere et al.

(10) Patent No.: US 9,116,040 B2
(45) Date of Patent: Aug. 25, 2015

(54) RADIATION DETECTION DEVICE WITH IMPROVED ILLUMINATION RANGE HAVING A PHOTODETECTOR THAT OPERATES IN TWO DETECTING MODES

(71) Applicant: SOCIETE FRANCAISE DE DETECTEURS INFRAROUGES—SOFRADIR, Chatenay Malabry (FR)

(72) Inventors: Alexandre Maltere, Saint-Egreve (FR); Laurent Rubaldo, Fontaine (FR)

(73) Assignee: SOCIETE FRANCAISE DE DETECTEURS INFRAROUGES—SOFRADIR, Chatenay Malabry (FR)

( * ) Notice: Subject to any disclaimer, the term of this patent is extended or adjusted under 35 U.S.C. 154(b) by 251 days.

(21) Appl. No.: 13/683,612

(22) Filed: Nov. 21, 2012

(65) Prior Publication Data

US 2013/0134298 A1 May 30, 2013

(30) Foreign Application Priority Data

Nov. 29, 2011 (FR) ...................... 11 03631

(51) Int. Cl.
*G01J 1/18* (2006.01)
*G01J 1/44* (2006.01)
*G01J 1/46* (2006.01)

(52) U.S. Cl.
CPC .... *G01J 1/18* (2013.01); *G01J 1/44* (2013.01); *G01J 1/46* (2013.01)

(58) Field of Classification Search
CPC ............. H01J 40/14; H01J 43/30; H03F 3/08; H03F 3/087; G02B 23/12; G01T 1/208; G01J 1/0295; G01J 1/10; G01J 1/42
USPC ......... 250/208.1, 214 R, 214.1, 214 VT, 207; 257/290–292, 440; 348/294–311; 313/103 CM, 103 R
See application file for complete search history.

(56) References Cited

U.S. PATENT DOCUMENTS

| 2009/0086071 A1* | 4/2009 | Kagawa et al. ............... 348/300 |
| 2010/0176275 A1* | 7/2010 | Vampola et al. .......... 250/214 A |
| 2011/0068860 A1 | 3/2011 | Baud |

FOREIGN PATENT DOCUMENTS

EP 2 302 341 A2 3/2011

OTHER PUBLICATIONS

Zanolla et al., "Reduction of RTS Noise in Small-Area MOSFETs Under Switched Bias Conditions and Forward Substrate Bias," *IEEE Transactions on Electron Devices*, May 2010, pp. 1119-1128, vol. 57, No. 5, published by IEEE.

*Primary Examiner* — Georgia Y Epps
*Assistant Examiner* — Carolynn A Moore
(74) *Attorney, Agent, or Firm* — Oliff PLC

(57) ABSTRACT

A pixel comprises a photodetector and a control circuit. The pixel is provided with an output terminal designed to connect an analysis circuit. The photodetector is configured to have two different operating modes associated with different biasing conditions. A switch connecting the photodetector to the output terminal of the pixel and a circuit for a connecting/disconnecting the control circuit with the output terminal of the pixel and with the photodetector allow to switch between the two operating modes. A comparator compares the voltage across the capacitive load with respect to a threshold value and outputs first and second signals according to the comparison. The comparator is connected to the circuit for connecting/disconnecting the control circuit and to the switch.

13 Claims, 3 Drawing Sheets

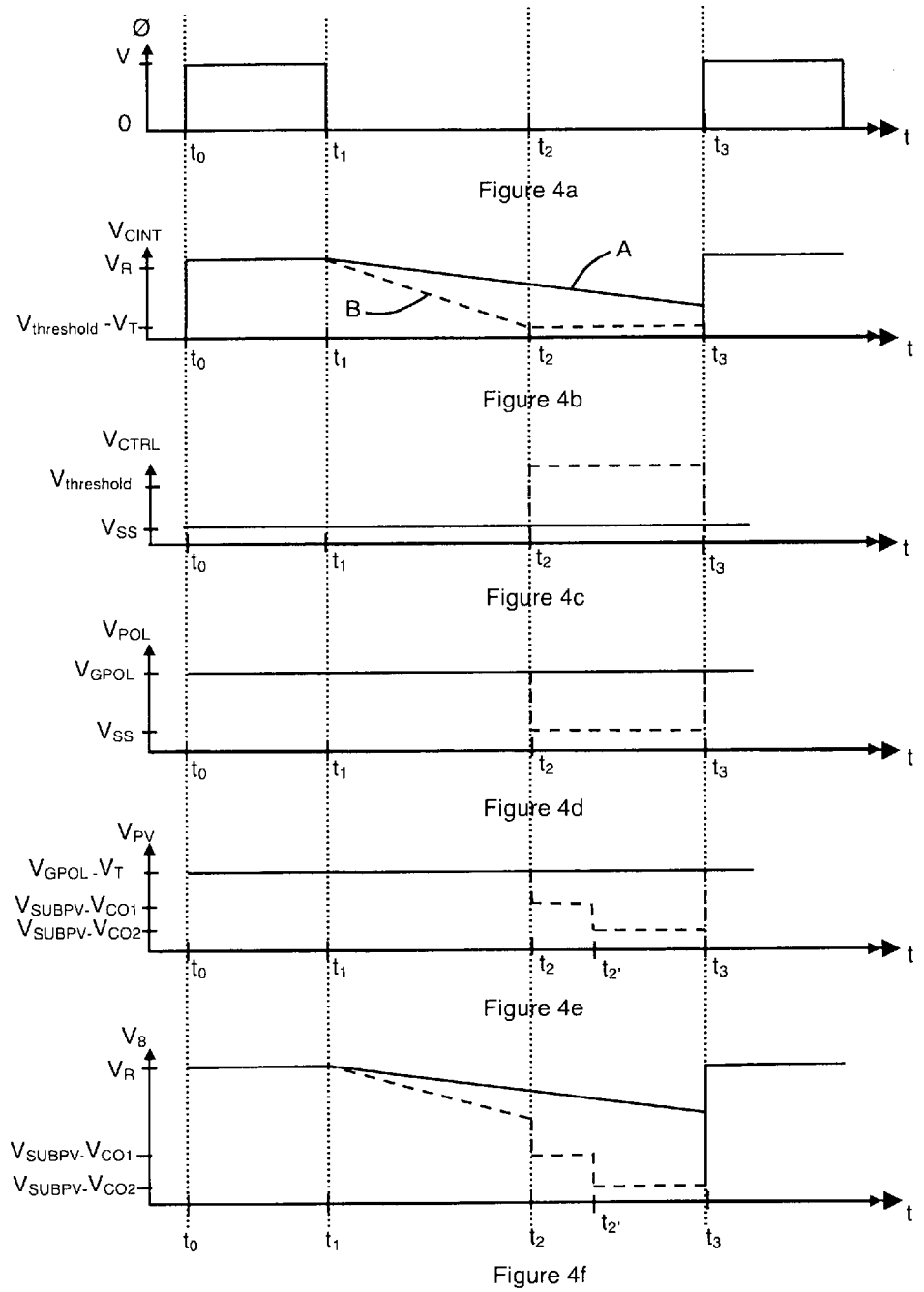

RADIATION DETECTION DEVICE WITH IMPROVED ILLUMINATION RANGE HAVING A PHOTODETECTOR THAT OPERATES IN TWO DETECTING MODES

FIELD OF THE INVENTION

The invention relates to a device for detecting electromagnetic radiation.

STATE OF THE ART

In the field of detecting devices, there is commonly a photodetector associated with a readout circuit. The photodetector is biased in a particular range of potentials so as to output a signal representative of the observed scene and this signal is processed by the readout circuit for dispatching the signal to an analysis circuit.

Biasing the photodetector is obtained by means of the substrate potential applied on a first terminal of the photodetector and by means of a reference potential applied on the second terminal of the photodetector. For example, a readout device of the capacitive transimpedance amplifier type can apply the reference potential.

Depending on the lighting conditions experienced, the photodetector delivers more or less current to the readout circuit integrating this information. In this way, if the photodetector receives radiation of low intensity, it emits an electrical signal of low intensity and if the intensity of the radiation increases, so does the same electrical signal from the photodetector.

As the electrical signal flowing through the detection device is a function of the intensity of the initial electromagnetic radiation, it is important to size the various elements forming the detection device in order to minimize as low as possible the importance of the spurious signals and obtaining an exploitable signal to noise ratio. For example, obtaining an acceptable signal to noise ratio needs a judicious selection concerning dimensioning of the readout circuit, in particular the value of the capacitive load and the power supply conditions applied to the various elements of the detection device.

The detection device is designed and/or biased based on expected illumination conditions. As a result, when the received electromagnetic radiation is larger than expected, the photodetector generates high signal saturating the electronic circuit in the detection device. The detection device is completely dazzled or only partially dazzled when some of the photodetectors are still able to provide information representative of the received luminous flux.

OBJECT OF THE INVENTION

It has been observed that a requirement exists to provide an improved detection device while at the same time being easy to implement.

This need tends to be satisfied by providing a detection device comprising:

A photodetector provided with two terminals,
A control circuit configured to convert the current issued from the photodetector into a first electrical variable by means of a load,
A pixel including the photodetector and the control circuit, the pixel being provided with an output terminal designed to be connected to an analysis circuit,
A biasing device of the photodetector configured to apply a first potential difference across the terminals of the photodetector in a first operating condition and configured so that one of the terminals of the photodetector is at a floating potential in a second operating condition,
A connecting circuit configured for connecting the control circuit with the output terminal of the pixel and with the photodetector when the photodetector is in the first operating mode, and configured for disconnecting the control circuit when the photodetector is in the second operating mode,
A switch configured to connect the photodetector with the output terminal of the pixel and configured to be in a blocking state when the photodetector is in the first operating mode and to be in a passing state when the photodetector is in the second operating mode,
A comparator configured for comparing the voltage across the load with respect to a threshold value and configured to deliver a first signal or the second signal according to the comparison, the comparator being connected to the connecting circuit and to the switch.

BRIEF DESCRIPTION OF DRAWINGS

Other advantages and features will become more clearly apparent from the following description of particular embodiments of the invention given for non-restrictive example purposes only and illustrated by means of the appended drawings, in which.

DESCRIPTION OF SPECIFIC EMBODIMENTS

Figure 1:
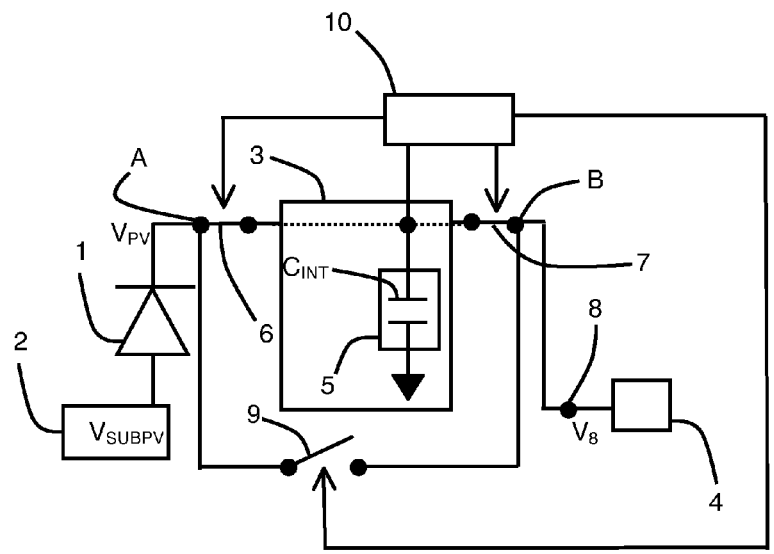
FIG. 1 schematically represents a detection circuit,
FIG. 2 schematically represents a particular embodiment of a detection circuit according to FIG. 1,
FIG. 3 schematically represents a particular embodiment of a comparator according to FIG. 2,
FIGS. 4a to 4f schematically represent chronograms of different voltages in the detection circuit.

As illustrated in FIG. 1, the detection device comprises at least one pixel, preferably a plurality of pixels which can be arranged in a matrix. A pixel comprises at least one photodetector 1. Thus, the detection device includes a photodetector 1, preferably a plurality of photodetectors which are arranged for example in a matrix.

The photodetectors 1 can be arranged along a first axis X of organization, that is to say, the photodetectors 1 form a row or a column according to the first axis X. Photodetectors 1 are aligned along X axis with a repetition pitch advantageously with a constant repetition pitch.

The photodetector 1 comprises a first terminal and a second terminal. The photodetector is biased to provide information on the observed scene to the analysis circuit.

The device comprises a switching circuit configured for switching the photodetector 1 between first and second operating modes. The switching circuit is configured to make the photodetector 1 operating in the first operating mode or in the second operating mode different from the first operating mode.

Biasing the photodetector 1 is realized by means of a biasing device which can be connected to each terminal of the photodetector 1. The biasing device of the photodetector 1 is configured to apply a first potential difference across the terminals of the photodetector 1 in the first operating mode. In the first operating mode, the first potential difference is applied between the terminals of the photodetector 1, here by the substrate potential $V_{SUBPV}$ and by the reference potential $V_{REF}$. Advantageously, the photodetector 1 is biased so as to obtain a linear conversion of the received electromagnetic flux into a current of charge carriers. In the particular case wherein the photodetector is a photodiode, the photodiode is preferably biased on the reverse bias plateau.

In a first operating mode, the photodetector is biased by means of a first potential difference applied between its first terminal and its second terminal. The first terminal is electrically linked to a first voltage source 2 providing a biasing voltage $V_{SUBPV}$ (also called substrate potential). The second terminal is electrically connected to an input terminal of a control circuit 3. According to embodiments, the control circuit 3 is configured to convert the current outputted from the photodetector into a first electrical variable and or to apply the reference potential $V_{REF}$ on its input terminal connected to the photodetector 1. In this way, the control circuit 3 is involved in applying the first potential difference across the terminals of the photodetector 1 and therefore obtaining the first operating mode. The reference voltage VREF is advantageously chosen to make the photodetector 1 operating in a linear conversion mode of the received electromagnetic flux into an electric current. The control circuit 3 acts as a conversion circuit, preferably linear, of the current signal into another electrical signal.

Biasing the second terminal may be performed by the control circuit 3 and/or by another circuit (not shown). In the illustrated example, the photodetector 1 is biased by means of the voltage source 2 and by means of the control circuit 3.

In a particular embodiment, integrating the information emitted by the photodetector 1 is performed by means of the control circuit 3 which may then comprise an integrating capacitor. In other embodiments, integration and/or storage of information is carried in an auxiliary circuit (not shown) which may be connected to the output of the device. In yet another embodiment, integrating the information is realized in the parasitic capacitor of the photodetector if the photodetector is a photodiode. In this case, the control circuit 3 performs biasing of the photodiode so that the photodiode operates as a Source Follower per Detector (SFD), conversion and integration of the current are made directly in the photodiode 1.

In a particular embodiment, the photodetector 1 is formed on a substrate made of semiconductor material and the bias voltage $V_{SUBPV}$ is applied in the semiconductor substrate via a bias line connected to the voltage source 2. The bias line is a line made of electrically conductive material, for example a metal line which runs on the surface of the substrate. In other embodiments, the bias line is a doped region of the substrate, this region is more doped than the rest of the substrate in order to reduce the potential drop along the bias line. Preferably, the bias line is a doped region which is of the same conductivity type as the substrate. The substrate is of a first conductivity type, for example of P-type. N type is also possible.

Advantageously, the photodetectors 1 are photodiodes and are reverse-biased between the bias voltage $V_{SUBPV}$ and the reference voltage $V_{REF}$ provided by the control circuit 3. However, it is also possible to use quantum well photodetector or multiple quantum well photodetectors (also QWIP) by adjusting the potential difference across the terminals of the photodetector 1 in order to obtain an electrical signal representative of the observed scene.

The pixel comprises a photodetector 1 and its associated control circuit 3. The pixel is connected to an analysis circuit 4 via its output terminal 8. The control circuit 3 is connected to the analysis circuit 4 in order to be able to provide the information emitted by the photodetector to the analysis circuit 4. Advantageously, the analysis circuit 4 is connected to a plurality of pixels 1 and therefore to a plurality of photodetectors of the matrix, for example a column or a row of photodetectors of the matrix.

The control circuit 3 advantageously comprises a capacitive load 5 configured to receive the electrical charges emitted by the photodetector 1 and thereby form an integrator circuit. The capacitive load 5 is charged by means of the current delivered by the photodetector 1. Different architectures of control circuits 3 are possible, eg control circuits 3 are direct injection circuits, buffered direct injection circuits or capacitive transimpedance amplifier circuits. The capacitive load 5 comprises at least one integrating capacitor $C_{INT}$. The current emitted by the photodetector is then converted into a voltage which is preferably proportional to the integrated current.

In other embodiments, the capacitive load 5 is replaced by a resistor or another element.

By means of the substrate potential $V_{SUBPV}$ and the reference potential $V_{REF}$ applied at the two terminals of the photodetector 1, the photodetector operates in the first operating mode converting the received electromagnetic flux into a representative electric current. In the particular illustrated case wherein the control circuit 3 comprises a capacitive load 5, the representative current is integrated in the capacitive load 5. The photodetector 1 provides a current signal representative of the observed scene. This current is converted into a voltage by means of the capacitive load 5. This voltage or a representative value of this voltage may be present on the output terminal 8 of the pixel so that the voltage may be sent to the analysis circuit 4.

The output voltage of the control circuit 3 is representative of the electric charges accumulated in the integrating capacitor $C_{INT}$ and therefore representative of the information in current supplied by the photodetector 1 over a preset period of time.

The switching circuit of the photodetector 1 is also configured to allow one of the terminals of the photodetector 1 to be at a floating potential in the second operating mode. In the second operating mode, a potential is imposed on one of the terminals and the other is left with a floating potential. The final value of this floating potential is used to characterize the observed scene. Advantageously, the substrate potential $V_{SUBPV}$ is applied as in the first operating mode so as to allow easy measurement of the potential at the other terminal. The floating potential or a representative value of this floating potential can be sent on the output terminal 8 of the pixel. When the photodetector operates in open circuit, that is to say one of its terminals is not biased, the potential of this terminal is representative of the received luminous flux. Conversion of this information is not linear but logarithmic which extends the conversion range.

The open circuit voltage of the photodiode $V_{CO}$ can be modeled by means of the following equation:

$$V_{CO} = \frac{nkT}{q} \ln\left(1 + \frac{I_\varphi}{I_{SAT}}\right)$$

wherein
$I_\varphi$ represents the current photogenerated by the photodiode,
$I_{SAT}$ represents the saturation current of the photodiode,
T represents the temperature in Kelvin of the photodiode
k represents the Boltzmann constant,
q represents an electron charge in Coulomb
n represents the ideality factor of the photodiode.

To achieve switching between the first operating mode and the second operating mode, the switching circuit comprises a connecting circuit configured for connecting/disconnecting the control circuit with the output terminal 8 of the photodetector 1.

The connecting circuit is configured for connecting the control circuit 3 with the output terminal 8 of the photodetector 1, when the photodetector 1 is in the first operating mode and for disconnecting the control circuit 3 when the photodetector 1 is in the second operating mode. Advantageously, the connecting circuit configured for connecting/disconnecting the control circuit 3 can also be configured for connecting/disconnecting the control circuit 3 with the output terminal 8 of the pixel.

The switching circuit also comprises a switch 9, which connects the photodetector 1 to the output terminal 8 of the pixel. The switch 9 is configured to be in the blocking state when the photodetector 1 is in the first operating mode and to be in the passing state when the photodetector 1 is in the second operating mode.

The switch 9 and the connecting circuit configured for connecting/disconnecting the control circuit 3 are preferably configured to be in opposite states so that the information emitted by the photodetector 1 can pass in two distinct paths so as to reach the output terminal 8. In the first case, the current emitted by the photodetector 1 arrives to the control circuit 3 and can be integrated into the capacitive load 5. The information integrated in the capacitive load 5 is then transmitted to the output terminal 8. The value of this potential or a value derived this potential is sent to the output terminal 8.

In the second operating mode, the photodetector 1 operates as a photovoltaic generator. In this operating mode, removing the current representative of the observed scene is limited inside the detection device. There is an increase of the voltage between the terminals of the photodetector and thus variation of the potential of the floating terminal according to the luminous flux received by the photodetector 1.

Here, in a particular embodiment, the biasing voltage $V_{SUBPV}$ is always applied on the photodetector 1, and the second terminal is left at a floating potential. In this case, the emitted electric charges are partly blocked in the photodetector and the value of the potential at the second terminal is used to characterize the observed scene. The voltage at the second terminal changes according to the received light intensity. In an alternative embodiment, the value of the potential substrate is different between the first and second operating modes in order to have more freedom in managing the range of tension in the second operating mode.

The connecting circuit configured for connecting/disconnecting the control circuit 3 may be achieved in various ways, for example by means of a pair of switches placed between the photodetector and the control circuit and between the output terminal and the control circuit. Here a switch is disposed on the input terminal and another switch is disposed on the output terminal of the control circuit 3 in order to make connection or disconnection between the photodetector 1 and the output terminal 8.

A first switch 6 is disposed between the photodetector 1 and the control circuit 3 so that the current delivered by the photodetector 1 passes through the first switch 6 to reach the control circuit 3 when the first switch 6 is in the passing state.

A second switch 7 is disposed at the output of the control circuit 3 so that the information emitted by the control circuit 3 to the output terminal 8 of the pixel passes through the second switch 7 when the latter is in the passing state.

In a preferred embodiment with compact configuration, the second switch 7 performs direct connection between the output terminal 8 of the pixel and the output terminal of the control circuit 3 which is one of the terminals of the capacitive load 5. It may be the same for the first switch 6 having a terminal directly connected to the photodetector 1 and another terminal directly connected to the control circuit 3.

In this case, the switch 9 can be described as third switch 9. The switch 9 and the assembly formed by the first switch 6, the control circuit 3 and the second switch 7 are connected in parallel.

In a preferred embodiment, the third switch 9 defines a first electrical node A with a terminal of the photodetector 1 and a terminal of the first switch 6. The third switch 9 defines a second electrical node B with the output terminal 8 of the pixel and a terminal of the second switch 7.

The third switch 9 is configured to be in a state opposite to the state of the first switch 6 and advantageously opposite to the state of the second switch 7. The opposite states of the first and second switches allow to have switching between the two operating modes without loss of electrical charges during the first operating mode. However, depending on the configuration of the circuit, it is possible to have the two transistors in the passing state.

Thus, when the third switch 9 is in a passing state, the first 6 and second 7 switches are in a blocking state. When the third switch 9 is in a blocking state, the first 6 and second 7 switches are in a passing state.

As a result, when the third switch 9 is in a passing state, the output terminal 8 is connected to the second terminal of the photodetector 1. In this case, the output terminal 8 is at the floating potential of the photodetector 1 and this information is transmitted to analysis circuit 4. The photodetector 1 directly delivers "voltage' voltage" information related to the observed scene. When the first switch 6 and the second switch 7 are in a passing state, the output terminal 8 of the pixel is connected to the output terminal of the control circuit 3. The control circuit 3 provides on the output terminal 8 of the pixel a voltage representative of the current supplied by the photodetector 1. The photodetector outputs information in "current" related to the observed scene. This information is transformed into "voltage" information by the control circuit 3.

When the current delivered by the photodetector 1 is very large, the control circuit 3 saturates and the output voltage at the output of the capacitor $C_{INT}$ is no longer representative of the information sent by the photodetector 1. This scenario may occur when the control circuit 3 includes or is coupled to an anti-blooming circuit removing the excess charges coming from the photodetector 1. The anti-blooming circuit starts operating when the potential difference at the terminals of the capacitive load 5 reaches a threshold value.

It is also possible that integrated information is no more representative of the observed scene when the bias conditions of the photodetectors 1 are shifted, for example because of a too large potential difference across the terminals of the capacitor $C_{INT}$ which leads to a change of the reference voltage $V_{REF}$ applied on the photodetector 1 by the control circuit 3.

In both cases, the pixel is no longer able to provide information representative of the observed scene because different illumination conditions are higher than the expected illumination conditions.

To store information related to the illumination conditions of the photodetector 1, the device comprises a comparator 10 configured for comparing the bias conditions across the terminals of the capacitive load 5 with respect to a threshold value $V_{threshold}$.

Depending on whether the measured value is less than or greater than the threshold value $V_{threshold}$, the comparator 10 outputs a first signal or a second signal at its output terminal. The first signal is different from the second signal.

In a particular embodiment, the comparator 10 performs measurement of the voltage across the terminals of the capacitive load 5, in this example at the terminals of the integrating capacitor $C_{INT}$. In an alternative embodiment, the comparator 10 performs measurement of the voltage on the output of the control circuit 3. In a preferred embodiment, a terminal of the capacitive load 5 is connected to a circuit applying a fixed potential, for example ground or other specific voltage of the detection device. In this case, measuring conditions at the terminals of the capacitive load 5 can be made by measuring the potential at the other terminal, that is to say, the terminal which is not at a fixed potential. The other terminal can be the output terminal of the control circuit 3 or another terminal of the control circuit 3.

More generally, voltage measurement can be performed on an electric node whose potential varies according to the amount of energy integrated in the capacitive load 5, so according to the potential difference existing between the terminals of the capacitive load 5.

The comparator 10 is connected to the connecting circuit configured for connecting/disconnecting the control circuit and to the switch 9. The passing and blocking states of the switch 9 and passing and blocking states of the connecting circuit are defined according to the signal emitted by the comparator 10, so according to the result of the comparison.

In the example of FIG. 1, the output terminal of the comparator 10 is connected to the control terminals of the first switch 6, of the second switch 7 and of the third switch 9.

The switches 6, 7 and 9 are configured such that as long as the voltage across the capacitive load 5 has not reached the threshold value $V_{threshold}$, the comparator 10 outputs the first signal, which results in a passing state for the first 6 and second 7 switches and a blocking state for the third switch 9. Depending on the biasing conditions, the first signal can be issued if the voltage across the capacitive load 5 is lower or higher than the threshold value $V_{threshold}$.

When the voltage across the capacitive load 5 reaches the threshold value or crosses the threshold value, the comparator 10 outputs the second signal, which results in a blocking state for the first 6 and second 7 switches and a passing state for the third switch 9. Switching prevents depolarization of the photodiode and saturation of the readout circuit when light flux becomes too high.

In this way, according to the amount of integrated electric charges in the capacitive load 5, the pixel sends "current" information or "voltage" information to the analysis circuit 4. The terms "current" or "voltage" correspond the operating modes of the photodetector 1.

While in the prior art, a bloomed pixel was not able to give any information on the state of the observed scene, this architecture is able to provide another information representative of the observed scene.

The "voltage" information comes from another operating mode of the photodetector. In this second operating mode, the photodetector acts as a photovoltaic cell, the bias across the photodetector 1 is linked to the conditions of illumination. The information is of a logarithmic-type according to the received light flux which results in compression of the scale of conversion existing between the light flux and the electrical signal. This compression of the scale can work on a much larger scale of the light flux. Even though the illumination is high in the second operating mode, the signal to noise ratio remains high even if the analysis circuit is not necessarily configured for optimal performance in this voltage range.

Even if it is difficult to compare the information given in the second operating mode with values of the information delivered during the first operating mode, it is possible to compare two illumination conditions for two photodetectors operating in the same operating mode. It is also possible to compare the same photodetector, in the same operating mode, giving different information relative to two different times.

This architecture easily allows modifying the conversion scale between the received light flux and the outputted electrical signal in order to adapt the detection device to the conditions of illumination. In the first operating mode, the photodetector delivers a current representative of the observed scene, preferably a current proportional to the observed scene allowing a detailed analysis.

In the second operating mode, the illumination conditions are stronger, the current is too large to be managed and it is chosen to work with a wider illumination range by analyzing the voltage across the photodetector 1.

Switching the first 6 and second 7 switches in the blocking state when the threshold value $V_{threshold}$ is reached avoids discharging the capacitive load 5 in the pixel which distorts the value of the "voltage" information. The same is true for the blocking state of the third switch 9 before the threshold value $V_{threshold}$ is reached. This configuration avoids loss of some electrical charges issued by the photodetector 1. These electrical charges would flow to exit 8 the pixel and to the analysis circuit 4. The electrical charges are thus not integrated into the capacitive load 5. Synchronizing the switches is advantageous so as to obtain the best sensitivity of information, but a time lag does not preclude having a switching between the first and second operating modes.

Figure 2:
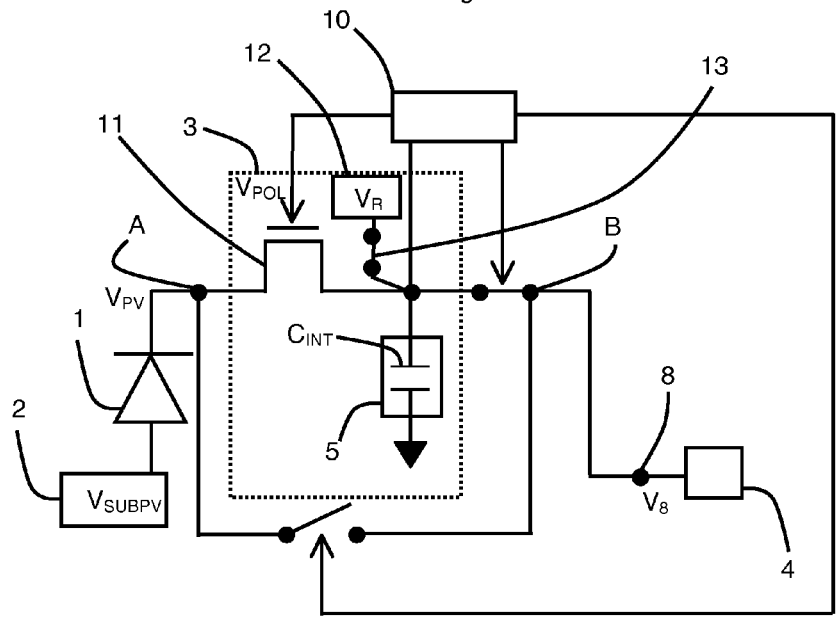

In a preferred embodiment illustrated in FIG. 2, the control circuit 3 is of the "direct injection" type, that is to say, a biasing transistor 11 is connected between the capacitive load 5 and the photodetector 1. Biasing applied to the gate electrode of the biasing transistor 11 allows setting the reference voltage $V_{REF}$ applied to the terminal of the photodetector 1.

The gate electrode of the biasing transistor 11 is coupled to the comparator 10 so that a first gate voltage is applied to the gate electrode when the voltage across the capacitive load 5 has not reached the threshold value and a second gate voltage is applied to the gate electrode when the voltage across the capacitive load reaches the threshold value 5. The two gate voltages applied to the biasing transistor 11 can be the first signal and the second signal issued by the comparator 10. However, the difference between the first signal and the second signal may also be a difference in current or other parameter, for example the frequency. A conversion circuit can then be used between the output of the comparator 10 and the gate electrode.

When the first gate voltage is applied, the biasing transistor 11 is in the passing state and the charges issued by the photodetector 1 are transferred to the control circuit 3 which integrate the information in the capacitive load 5. When the second gate voltage is applied, the biasing transistor 11 is in the blocking state.

The biasing transistor 11 can be assimilated to the first switch 6 because it prevents or allows transit of electrical charges between the photodetector and the capacitive load 5. In this embodiment, the biasing transistor 11 of the control circuit 3 is also a part of the connecting circuit configured for connecting/disconnecting the control circuit 3. In the case where the potential applied to the gate electrode of the transistor 11 is derived directly or indirectly from the comparator, the first switch 6 is advantageously the biasing transistor 11.

In a particular very compact embodiment and, the second terminal of the photodetector 1 is connected to a first terminal of the biasing transistor 11 and to the first terminal of the third switch 9 so as to form the electrical node A.

The second terminal of the biasing transistor 11 is connected to a first terminal of the integrating capacitor $C_{INT}$. The second switch 7, the third switch 9 and the output terminal 8 of the pixel are connected together so as to form the second electrical node B.

The second terminal of the integrating capacitor $C_{INT}$ is connected to a fixed potential (here ground) coming from a biasing circuit. The comparator 10 performs measurement of the potential present at the first terminal of the capacitor $C_{INT}$ so as to monitor the potential during charging of the integrating capacitor $C_{INT}$ by means of the current supplied by the photodetector 1.

A second voltage source 12 can be used to deliver a reset voltage $V_R$ for resetting the capacitive load 5. The second voltage source 12 is connected to the first terminal of the integrating capacitor $C_{INT}$ via a fourth switch 13. When the fourth switch 13 is in the passing state, the integrating capacitor is reset. Resetting the capacitive load can also be achieved by other circuits.

As the comparator 10 is connected to various elements of the detection device, it is advantageous to provide several output terminals each delivering a first signal and a second signal in different ranges of voltage. For example, the voltage $V_{POL}$ applied to the gate electrode of the biasing transistor 11 may be different from the voltage applied to the second and/or third switches.

The comparator 10 may comprise an output providing the first signal and the second signal. This output can be connected to a bypass circuit coupled to a circuit for changing voltage levels. In this way, the signal issued by the comparator 10 is converted into a plurality of signals with preferably the same phase. The various signals can then be in different voltage ranges.

In an alternative embodiment, the bypass circuit is integrated into the comparator 10 and the circuit for changing voltage levels can also be integrated to the comparator.

Figure 3:
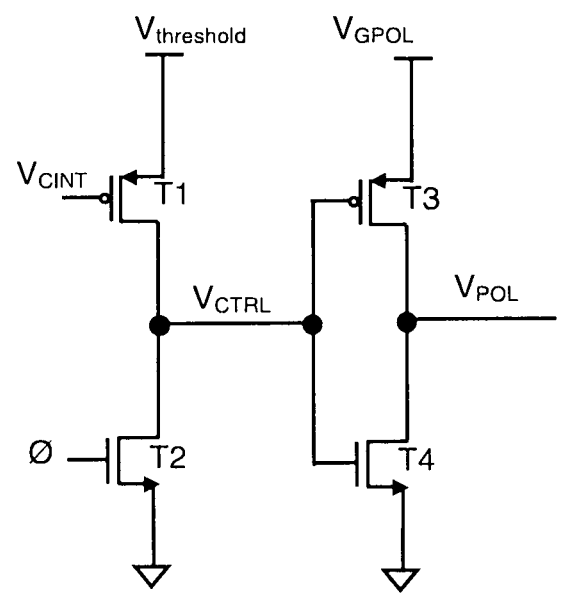

For example, FIG. 3 shows a particular embodiment of the comparator 10. The comparator 10 comprises a first transistor T1 and a second transistor T2 connected in series. The two transistors are connected in series between the threshold voltage $V_{threshold}$ and a fixed voltage of the circuit which is ground or the power supply voltage Vdd. The two transistors T1 and T2 are of opposite types. In the particular example of FIG. 3, the two transistors T1 and T2 are connected between ground and the threshold value $V_{threshold}$. The transistor T1 is of the PMOS type and connected to the threshold voltage $V_{threshold}$. The transistor T2 is connected to ground and is of the NMOS type. The threshold voltage is applied by means of an additional voltage source (not shown).

The voltage measured by the comparator 10 is applied to the gate electrode of the transistor connected to the additional voltage source supplying the voltage threshold $V_{threshold}$. The other gate electrode receives a reset signal Ø for resetting the capacitive load 5.

The common terminal of the transistors T1 and T2 provides a signal $V_{CTRL}$ representative of the comparison of the voltage at the terminals of the capacitive load 5 with respect to the threshold value $V_{threshold}$. In the illustrated example, the signal $V_{CTRL}$ is equal to ground as the voltage $V_{CINT}$ is greater than the threshold value $V_{threshold}$ (minus the threshold voltage of the transistor T1). Once the voltage $V_{CINT}$ is equal to the voltage $V_{threshold}$, the signal $V_{CTRL}$ is equal to the threshold value $V_{threshold}$. The voltage $V_{CTRL}$ presents two distinct states representative of the first signal and of the second signal.

Opposite operation may be achieved by replacing ground by the voltage Vdd and by replacing NMOS transistors by PMOS transistors and vice versa.

The signal $V_{CTRL}$ is connected to the gate electrodes of two others transistors, transistors T3 and T4. The third transistor T3 and the fourth transistor T4 are connected in series. The third transistor is of a type opposite to the type of the fourth transistor. In the illustrated example, transistors T3 and T4 are connected in series between the first biasing voltage and the second biasing voltage of the gate electrode of the biasing transistor 11. In the illustrated example in FIG. 3, the first biasing voltage is voltage $V_{GPOL}$ and the second biasing voltage is ground. The common terminal of transistors T3 and T4 is connected to the gate electrode of the biasing transistor 11, which is here of the NMOS type.

The transistors T3 and T4 form a shifting circuit configured for shifting the voltage levels associated with the first signal and the second signal.

In this way, according to the result of the comparison between the threshold voltage and the voltage between the terminals the integrating capacitor $C_{INT}$, the first or the second bias voltage is applied to the gate electrode of transistor 11.

The common terminal of transistors T3 and T4 supplies a signal $V_{POL}$ which is applied to the gate electrode of the biasing transistor 11. In this way, it is possible to easily obtain a compact configuration wherein a comparator 10 is able to deliver a signal compatible with the biasing conditions of the gate electrode of the transistor 11. This circuit can change the voltage range between signal $V_{CTRL}$ and the voltage applied to the biasing transistor 11.

A similar integration may be performed so as to switch the switches 7 and 9. Such configuration is achievable by duplicating the second group of transistors T3 and T4, by applying the signal $V_{CTRL}$ to them and by modifying the supply conditions. A second circuit for shifting the voltage levels is made, for example between voltage Vdd and ground. The output of this second circuit for shifting the voltage levels is sent to the gate electrode of the switches 7 and 9.

In an alternative embodiment, it is advantageous to form switch 7 and/or switch 9 by two transistors connected in parallel. The two transistors are of opposite types. Thus, the NMOS transistor receives a signal and the PMOS transistor receives the complementary or opposite signal.

If switching of the transistors 7 and 9 is simultaneous, it is advantageous to apply the same signal on the NMOS transistor of the switch 7 and on the PMOS transistor of switch 9. The complementary signal is then applied to the NMOS transistor of switch 9 and to the PMOS transistor of switch 7.

FIGS. 4a to 4f represent different chronograms of characteristic elements of the detection device. FIG. 4a represents the reset signal Ø for resetting the capacitive load, which allows defining the integration period and the refresh period of the circuit. At time $t_0$, the signal Ø switches the fourth switch 13 to the passing state or another circuit for resetting the integrating capacitor. The reset occurs between times $t_0$ and $t_1$. Integration of the observed scene takes place between times $t_1$ and $t_3$. At time $t_3$, a new integration cycle begins with a reset phase of the capacitive load 5.

FIG. 4b represents the voltage across the terminals of the capacitive load 5 in two different illumination conditions illustrated by curves A and B. FIG. 4c shows the voltage $V_{CTRL}$ issued on the output of the comparator 10 for both illumination conditions. FIG. 4d represents the voltage applied to the gate electrode of the biasing transistor 11. FIG. 4e represents the evolution of the value of potential $V_{PV}$ of the second terminal of the photodetector. FIG. 4f represents the evolution of the potential value $V_8$ of the output terminal 8.

As represented in FIG. 4b, curve A (solid line) corresponds to a first illumination condition wherein the voltage across the capacitive load does not reach the threshold voltage $V_{threshold}$ at the end of the integration period $t_3$. In the case of curve A, the voltage $V_{CINT}$ is always greater than the voltage $V_{threshold}-V_T$ between times $t_1$ and $t_3$. The illumination is considered constant leading to a constant voltage evolution across the integrating capacitor $C_{INT}$.

At time t3, as the voltage across the capacitive load remains above the threshold value, here the threshold voltage injected by the additional voltage source minus the threshold voltage $V_T$ of the transistor 13 (FIG. 4b), the comparator 10 does not change its state and the first signal, here the voltage $V_{SS}$, is issued by the comparator 10 during all the integration period (between times $t_1$ and $t_3$) as shown in FIG. 4c. Voltage $V_{POL}$ applied to the gate of the biasing transistor 11 is constant during all the integration period and is equal to voltage $V_{GPOL}$ as illustrated in FIG. 4d.

Voltage $V_{PV}$ on the second terminal of the photodetector 1 is equal to $V_{GPOL}-V_T$, that is to say the voltage applied to the gate electrode of the biasing transistor 11 minus the threshold voltage of the latter (FIG. 4e).

In the example shown, the tensions $V_{CTRL}$, $V_{POL}$ and $V_{PV}$ are constant between times $t_0$ and $t_3$.

Information sent by the pixel corresponds to the voltage on the output terminal B which corresponds here to the fixed voltage $V_R$ applied to a terminal of the capacitor $C_{INT}$ minus the integral of the integration current over the integration period (here $I*(t_3-t_1)$) divided by the electrical capacitance value of the capacitive load (FIG. 4f) that is to say $V_R-I*(t_3-t_1)/C_{INT}$. The value of voltage $V_8$ evolves from time $t_1$ according to the current delivered by the photodetector.

When the current issued by the photodetector is larger (curve B of FIGS. 4b-4f, dotted line), the voltage across the capacitive load reaches the threshold value as can be seen in FIG. 4b. At time $t_2$, the voltage across the capacitive load reaches the threshold value. Between times $t_1$ and operation of the device is identical to the operation already described for curve A.

Between times $t_1$ and $t_2$, the comparator 10 sends the first signal from its output terminal. From time $t_2$ to time $t_3$, the comparator 10 now sends the second signal, here the signal $V_{threshold}$ (FIG. 4c).

Therefore, a first biasing voltage, voltage $V_{GPOL}$ is applied to the gate electrode of the biasing transistor 11 between times $t_0$ and $t_2$. A second biasing voltage (here $V_{SS}$) is applied from time $t_2$ to time $t_3$ (FIG. 4d). The biasing transistor 11 becomes blocking from time $t_2$.

Between times $t_1$ and $t_2$, the voltage applied to the second terminal of the photodetector is equal to $V_{GPOL}-V_T$ as in the case of curve A. From time $t_2$ to time $t_3$, the voltage at the second terminal of the photodetector is equal to the voltage applied to the first electrode minus the open circuit voltage $V_{CO}$ linked to illumination conditions of the photodetector. In the illustrated example, a first illumination condition is applied between times $t_2$ and $t_{2'}$. A second illumination condition is applied between times $t_{2'}$ and $t_3$. When illumination conditions change, there is a change in the voltage on the second electrode of the photodetector (FIG. 4e). Increasing the illumination of the photodetector will increases the gap to the voltage applied on the first terminal.

From the beginning of the integration period up to time $t_2$, the voltage on the output terminal 8 corresponds to the integrated current as in the case of curve A. From time $t_2$, the biasing conditions of the photodetector change and the output voltage $V_8$ corresponds to the voltage at the second terminal of the photodetector. Thus, if the lighting conditions change after time $t_2$, there is a change in the output voltage $V_8$.

The invention claimed is:

1. Device for detecting electromagnetic radiation comprising:
   a photodetector provided with two terminals;
   a control circuit configured to convert the current issued by the photodetector into a first electrical variable by means of a load;
   a pixel including the photodetector and the control circuit, the pixel being provided with an output terminal designed to be connected to an analysis circuit;
   a biasing circuit of the photodetector configured to apply a first potential difference across the terminals of the photodetector in a first detecting mode and configured so that one of the terminals of the photodetector is at a floating potential in a second detecting mode, the second detecting mode being a photovoltaic detecting mode whereby the photodetector generates a voltage signal which has a logarithmic relationship to radiation flux received:
   a connecting circuit configured to connect the control circuit with the output terminal of the pixel and with the photodetector when the photodetector is in the first detecting mode, and configured to disconnect the control circuit from the output terminal of the pixel and the photodetector when the photodetector is in the second detecting mode;
   a switch connecting the photodetector to the output terminal of the pixel and configured to be in the blocking state when the photodetector is in the first detecting mode and to be in the passing state when the photodetector is in the second detecting mode; and
   a comparator configured to compare the voltage across the load with respect to a threshold value and configured to deliver a first signal or a second signal according to the comparison, the comparator being connected to the connecting circuit and to the switch.

2. Device according to claim 1, wherein the comparator is configured so that the control circuit is connected to the photodetector and to the output terminal of the pixel as long as the voltage across the terminals of the load has not reached the threshold value, and so that the photodetector is connected to the output terminal of the pixel when the voltage across the terminals of the load reaches the threshold value.

3. Device according to claim 2, wherein the connecting circuit comprises a first switch connected between the photodetector and the control circuit.

4. Device according to claim 3, wherein in that the connecting circuit comprises a second switch connected between the control circuit and the output terminal of the pixel.

5. Device according to claim 4, wherein the load is a capacitive load comprising an integrating capacitor having a first terminal connected to a circuit configured to apply a fixed potential on the first terminal and in that the comparator is connected to a second terminal of the integrating capacitor.

6. Device according to claim 1, wherein the connecting circuit comprises a first switch connected between the photodetector and the control circuit.

7. Device according to claim 6, wherein in that the connecting circuit comprises a second switch connected between the control circuit and the output terminal of the pixel.

8. Device according to claim 7, wherein the load is a capacitive load comprising an integrating capacitor having a first terminal connected to a circuit configured to apply a fixed potential on the first terminal and in that the comparator is connected to a second terminal of the integrating capacitor.

9. Device according to claim 1, wherein in that the control circuit is a direct injection circuit with a biasing transistor having a first terminal connected to the photodetector and a second terminal connected to the load, the biasing transistor forms a part of the connecting circuit, a gate electrode of the biasing transistor being connected to the comparator.

10. Device according to claim 9, wherein the load is a capacitive load comprising an integrating capacitor having a first terminal connected to a circuit configured to apply a fixed potential on the first terminal and in that the comparator is connected to a second terminal of the integrating capacitor.

11. Device according to claim 1, wherein in that the connecting circuit comprises a second switch connected between the control circuit and the output terminal of the pixel.

12. Device according to claim 1, wherein the load is a capacitive load comprising an integrating capacitor having a first terminal connected to a circuit configured to apply a fixed potential on the first terminal and in that the comparator is connected to a second terminal of the integrating capacitor.

13. Device according to claim 1, wherein the comparator comprises an output terminal connected to the analysis circuit and configured to inform the analysis circuit of the detecting mode of the photodetector.

* * * * *